US010932220B2

(12) United States Patent
Yu et al.

(10) Patent No.: US 10,932,220 B2
(45) Date of Patent: Feb. 23, 2021

(54) WIRELESS NODE LOCATION IDENTIFICATION

(71) Applicant: Analog Devices, Inc., Norwood, MA (US)

(72) Inventors: Tao Yu, Cambridge, MA (US); Tze Lei Poo, Cambridge, MA (US); Lance Doherty, Boston, MA (US); Philip P. E. Quinlan, Glounthaune (IE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 16/659,887

(22) Filed: Oct. 22, 2019

(65) Prior Publication Data

US 2020/0137712 A1    Apr. 30, 2020

Related U.S. Application Data

(60) Provisional application No. 62/751,296, filed on Oct. 26, 2018.

(51) Int. Cl.
*H04W 4/40* (2018.01)
*H04W 64/00* (2009.01)
*G01S 13/84* (2006.01)
*B62D 65/00* (2006.01)
*G07C 5/08* (2006.01)

(52) U.S. Cl.
CPC ............ *H04W 64/00* (2013.01); *G01S 13/84* (2013.01); *H04W 4/40* (2018.02); *B62D 65/005* (2013.01); *G07C 5/08* (2013.01)

(58) Field of Classification Search
CPC ......... H04W 64/00; G06F 16/00; H04L 67/18
See application file for complete search history.

(56) References Cited

U.S. PATENT DOCUMENTS

| 10,469,184 | B1  | 11/2019 | Yu     |            |
|------------|-----|---------|--------|------------|
| 2018/0132285 | A1* | 5/2018  | Jackson | G08G 1/0955 |
| 2018/0160333 | A1* | 6/2018  | Patil  | H04L 67/12 |

FOREIGN PATENT DOCUMENTS

| CN | 103348747 A | 10/2013 |
| CN | 107959943 A | 4/2018 |
| JP | 2009282009 A | 12/2009 |

(Continued)

OTHER PUBLICATIONS

"Chinese Application Seriall No. 201911020095.2, Office Action dated Nov. 3, 2020", 7 pgs.

(Continued)

*Primary Examiner* — Michael T Vu
(74) *Attorney, Agent, or Firm* — Schwegman Lundberg & Woessner, P.A.

(57) ABSTRACT

Systems and methods permit automatic joining of a network associated with a specified area within which wireless nodes reside. Network managers located in or near the specified area use wireless proximity detection to estimate distances to wireless nodes requesting to join the network. The network managers can use the estimated distances to determine whether or not a requesting wireless node is located within the specified area. If the requesting wireless node is located within the specified area, the network managers can permit the wireless node to join the wireless network associated with the respective specified area.

20 Claims, 10 Drawing Sheets

(56) References Cited

FOREIGN PATENT DOCUMENTS

| JP | 2011259030 A | 12/2011 |
|----|--------------|---------|
| JP | 2013031045 A | 2/2013 |
| JP | 2013155725 A | 10/2018 |
| WO | WO-2018085814 A1 | 5/2018 |
| WO | WO-2018102085 A1 | 6/2018 |

OTHER PUBLICATIONS

"Japanese Application Serial No. 2019-194548, Notification of Reasons for Refusal dated Jan. 12, 2021", w/ English translation, 12 pgs.

* cited by examiner

WIRELESS NODE LOCATION IDENTIFICATION

CLAIM OF PRIORITY

This application claims the benefit of priority to U.S. Provisional Application Ser. No. 62/751,296, filed Oct. 26, 2019, which is incorporated by reference in its entirety.

TECHNICAL FIELD

This document pertains generally, but not by way of limitation, to wireless networks, and particularly but not by way of limitation to identifying a location of wireless nodes attempting to join a wireless network.

BACKGROUND

Wireless networks can be established to facilitate data collection and communication between wireless nodes. For example, wireless sensors can be positioned to collect data regarding an environment and communicate the data back to a control system. Several wireless sensors can be configured to form a network of sensors all configured to collect and report sensed data back to a common control system. The collected and reported data can be used by the control system to make observations and provide control for the environment within which the network resides.

SUMMARY

The present inventors have recognized, among other things, that it can be desirable to allow wireless nodes to automatically join a network associated with a vehicle or other specified area within which the wireless nodes reside. Network managers located on the vehicle or other specified area use wireless proximity detection to estimate distances to wireless nodes requesting to join the network. The network managers can use the estimated distances to determine whether or not a requesting wireless node is located on the respective vehicle or other specified area. If the requesting wireless node is located within the specified area, the network managers can permit the wireless node to join the wireless network associated with the specified area.

In one example, a system for automatically associating a plurality of wireless nodes distributed about a vehicle with a wireless network based on location, while excluding nearby wireless nodes based on location, includes a wireless network manager device located at a specified location. The wireless network manager is configured to receive a wireless request to join the wireless network from a requesting wireless node, and is configured to determine, using wireless proximity detection, whether the requesting wireless node is located on the vehicle and, if so, to permit the requesting wireless node to join the wireless network.

In another example, method of automatically associating wireless nodes distributed about a first vehicle with a wireless network associated with the specified area, while excluding nearby wireless nodes that are not located within the first vehicle, includes receiving, by a first network manager device positioned at a first specified location, a wireless request to join the wireless network from a requesting wireless node; determining, by the first network manager device using wireless proximity detection, if the requesting wireless node is located on the first vehicle; and permitting the requesting wireless node to join the wireless network if the requesting wireless node is located on the first vehicle.

In another example, a system for automatically associating a plurality of wireless nodes that are distributed about a vehicle with a wireless network associated with a network manager located on the vehicle, while excluding nearby wireless nodes that are not located on the vehicle, includes a computing device located off the vehicle. The computing device is configured to receive a wireless request to join the wireless network from a requesting wireless node; determine, using wireless proximity detection, whether the requesting wireless node is located on the vehicle; and provide an encryption key of an encryption keypair to the requesting wireless node if the requesting wireless node is located on the vehicle for the requesting wireless node to join the wireless network associated with the network manager.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A wireless network is disclosed herein that includes network managers capable of automatically confirming a location of a wireless node when establishing a wireless network connection. In one example, a vehicle can include two network managers positioned on the vehicle and configured to manage a wireless network associated with the vehicle. When a wireless node requests to join the network, the two network managers can estimate a position of the wireless node using various techniques to determine if the wireless node is positioned on the vehicle. If the wireless node is not located on the vehicle, the network managers can deny the request of the wireless node to join the network.

In another example, network managers or other computing systems not configured to manage the network can be located off of the vehicle and configured to confirm the location of wireless nodes trying to join the network. These computing systems can estimate a position of the wireless node using various techniques to determine if the wireless node is positioned on the respective vehicle. If the wireless node is positioned on the vehicle, the network manager can provide the wireless node with an encryption key usable to join the network.

In another example, network managers or other computing systems located within a warehouse or other facility may be configured to establish wireless networks with stored wireless nodes. The network managers may be configured to estimate a position of a stored wireless node using various techniques to determine if the wireless node is positioned within a specified area, such as on a specific shelf or other storage location. If the wireless node is positioned within the specified area, the network manager can permit the wireless node to join the network. Knowing the locations of the network nodes is also beneficial in facilitating immediate location of nodes that have failed, are malfunctioning, or otherwise require service due to anomalous behavior.

Generally available techniques of establishing wireless networks for wireless nodes on a vehicle involve manual programming of network manager access control lists. The network managers use these manually programmed lists to accept connections only from the wireless nodes positioned on the vehicle. These techniques require a significant amount of manual labor in programming the access control lists. By contrast, the present inventors have developed a scheme that facilitates automatic establishment of networks for vehicles at the time of assembly, when vehicles are serviced, during/following battery recharging, during vehicle use, when re-establishing the wireless network, or at any other time it is desirable to automatically establish the network. Accordingly, the manual labor associated with programming access control lists for the network managers can be reduced or eliminated.

Figure 1:
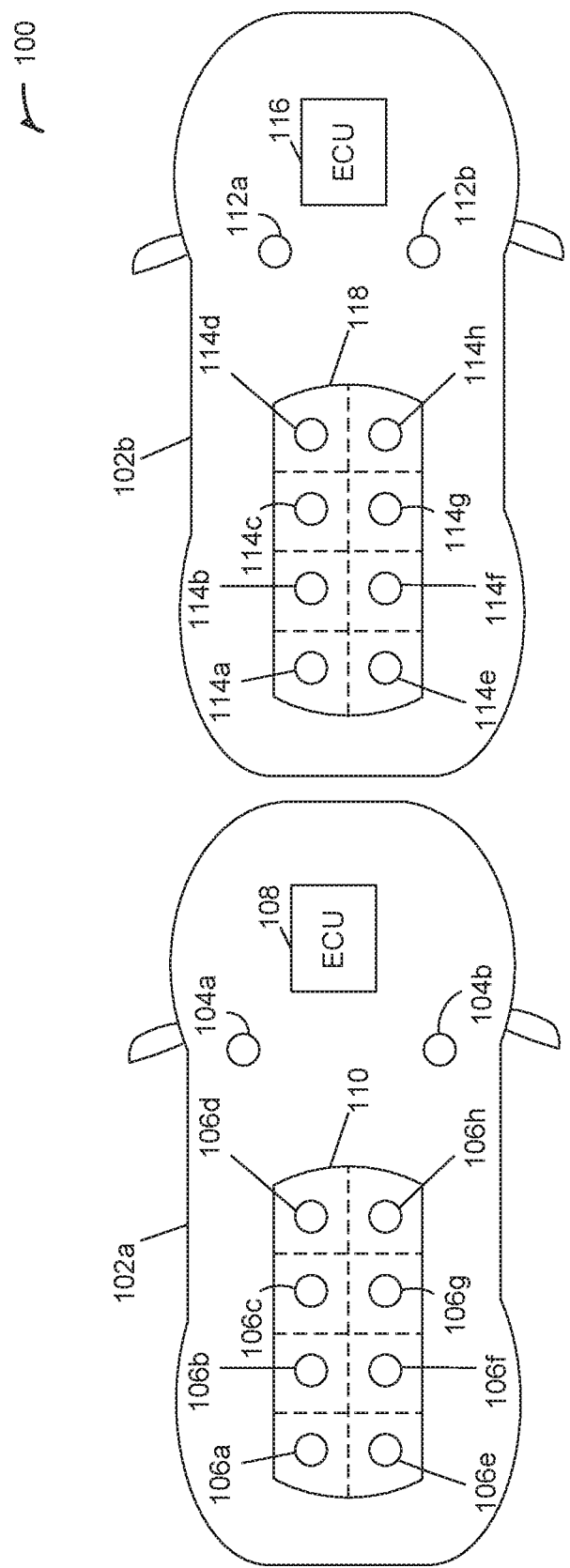
FIG. 1 is a block diagram illustrating two vehicles that each include wireless battery monitoring systems.

FIG. 1 is a block diagram illustrating an example system 100 that includes two vehicles 102a and 102b that each include wireless battery monitoring systems. The first vehicle 102a includes two network managers 104a and 104b, wireless nodes 106a-106h, an electronic control unit (ECU) 108, and a battery 110. The second vehicle 102b includes two network managers 104a and 104b, wireless nodes 106a-106h, an ECU 116, and a battery 118. In other examples, the vehicles 102a and 102b can include any number of other systems or equipment monitored using wireless nodes 106a-106h and 114a-114h. While illustrated as including eight wireless nodes and two network managers, the vehicles can each include any number of wireless nodes and any number of network managers. Each of the wireless nodes 106a-106h and 114a-114h, and the network managers 104a, 104b, 112a, and 112b can be located at any position on the respective vehicle 102a and 102b. While illustrated and discussed as automobiles, the vehicles can be any fully battery powered or battery assisted forms of transportation including aircraft, drones, trains, rail carriages, boats, mining/tunnel boring machines, and the like.

The wireless nodes 106a-106h and 114a-114h can be wireless sensors, for example, configured to sense operational characteristics of the respective batteries 110 and 118, including, but not limited to, a voltage or current running through a respective cell of the batteries 110 and 118. The network managers 104a and 104b can collect the sensed data from the wireless nodes 106a-106h, for example, and provide the data to the ECU 108 or other system through a wired or wireless connection. The ECU 108 can use the data to monitor the health of, and provide control for, the battery 110.

The network managers 104a and 104b and the wireless nodes 106a-106h form a first network associated with the first vehicle 102a, and the network managers 112a and 112b and the wireless nodes 114a-114h form a second network associated with the second vehicle 102b. When the vehicles 102a and 102b are first assembled, the wireless nodes 106a-106h and 114a-114h must join the respective network.

During the assembly of vehicle 102a, for example, one or both of the network managers 104a and 104h can send out advertisement packets intended for the wireless nodes 106a-106h. The wireless nodes 106a-106h can respond to the advertisement packets by transmitting a wireless request to the join the network. However, on an assembly line or other service scenario, for example, some of the wireless nodes 114a-114h of the vehicle 102b can be closer to the network managers 104a and 104b than some of the wireless nodes 106a-106h. For example, the wireless node 114a can be closer to the network manager 104a than the wireless node 106a. Both of the wireless nodes 106a and 114a will receive the advertisement packet from the network managers 104a and 104b and transmit a respective request to join the network associated with the vehicle 102a. The network managers 104a and 104b are configured to receive both requests to join the network associated with the vehicle 102a, permit the wireless node 106a to join the network, and deny access to the wireless node 114a.

Figure 2:
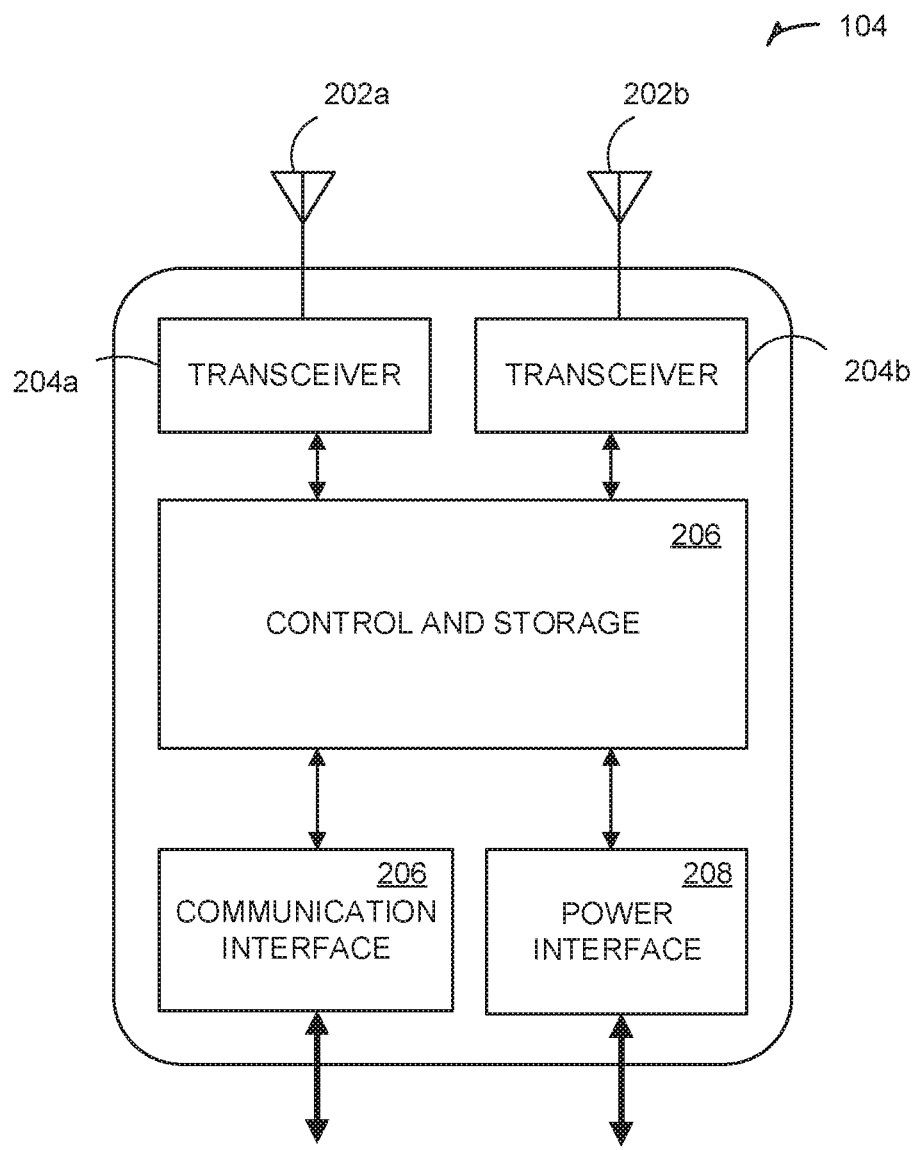
FIG. 2 is a block diagram illustrating an example network manager.

FIG. 2 is a block diagram illustrating an example network manager 104 for the wireless network associated with the vehicle 102a. The network manager 104, for example, can be any of the network managers 104a, 104b, 112a, or 112b of FIG. 1. In the example illustrated in FIG. 2, the network manager 104 includes antennas 202a and 202b, transceivers 204a and 204b, a control and memory circuit 206, a power interface 208, and a wired communication interface 210. While illustrated as including two transceivers 204a and 204b that permit communication with multiple wireless nodes 106a-106h contemporaneously, the network manager 104 can include any number of antennas and transceivers. In an example, the antennas 202a and 202b and the transceivers 204a and 204b can be configured to transmit and receive data using radio-frequency (RF) energy.

In some examples, such as in a battery pack can, large signal loss due to multipath effects can occur between wireless nodes and network managers. The existence of multipath effects can cause deep spectral nulls to occur causing significant attenuation at certain frequencies. To accommodate these multipath effects, the network manager and/or the wireless nodes may employ the use of antenna diversity techniques, antenna polarization techniques and/or the use of directional antennae techniques to improve radio-frequency (RF) link margin and to minimize (RF) propagation loss due to multipath effects.

The control and memory circuit 206 can include one or more application-specific or general-purpose processor circuits, for example. Such circuits can include system-on-chip (SoC) realization or such circuits can be field-programmable. As an illustrative example, the control and memory circuit 206 can include two controllers, one being a field programmable gate array (FPGA) and the other being a digital signal processor (DSP). The FPGA can be connected to control multi-channel communication using the two transceivers 204a and 204b, for example, and the DSP can be used for real-time processing such as downsampling, upsampling, coding, or decoding. In other examples, the control and memory circuit 206 can include any number of controllers including FPGAs, DSPs, microprocessors, application specific integrated circuits (ASICs) or other digital logic circuits.

The control and memory circuit 206 can also include one or more volatile or non-volatile memories. For example, the control and memory circuit 206 can include one or more non-volatile memories including read-only memories (ROMs), flash memories, solid state drives, or any other non-volatile memory, and one or more volatile memories including, for example, static or dynamic random-access memories (RAM).

The power interface 208 can be configured to connect through a wired connection to receive power, and the communication interface 210 can be configured for wired communication with one or more of another network manager 104 and a backend system, such as the ECU 108. For example, the power interface 208 can be connected to receive power from a vehicle power bus of the vehicle 102a, such as a direct current (DC) bus, and condition the power for use by the control and memory circuit 208. The network manager 104 can also include a backup power source such as a battery, capacitor, or energy harvester circuit. In some examples, the network manager 104 may not be powered using a wired power connection and may be completely powered using a local power source such as a battery or energy harvester.

Figure 3:
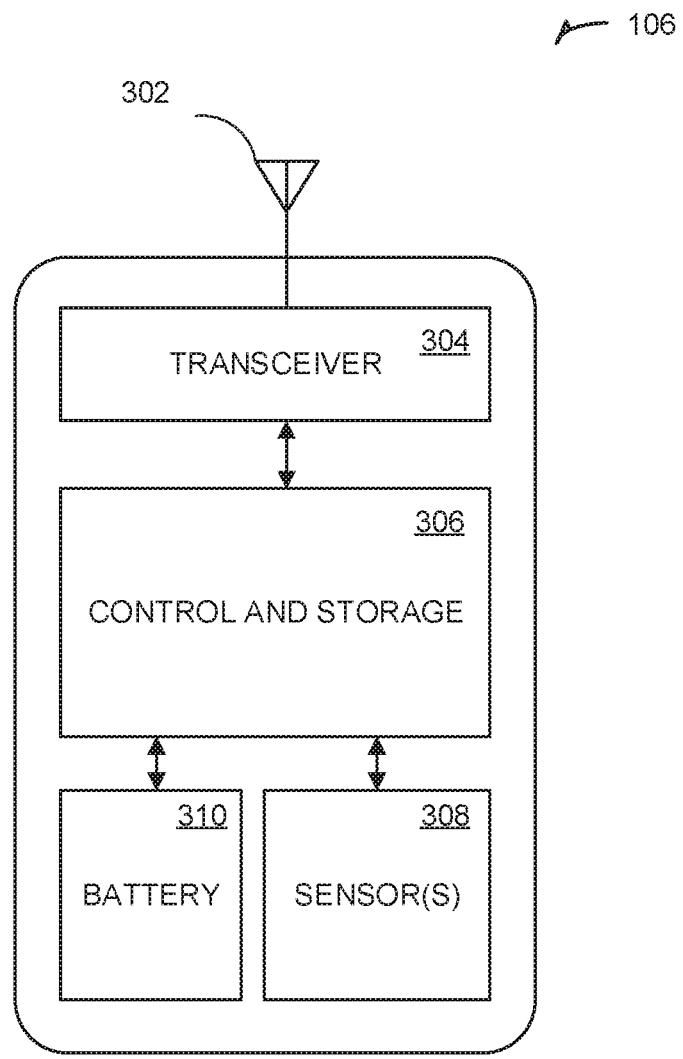
FIG. 3 is a block diagram illustrating an example wireless node.

FIG. 3 is a block diagram illustrating an example wireless node device 106 of the vehicle 102a. The wireless node 106, for example, can be any of nodes 106a-106h and 114a-114h of FIG. 1. In the example illustrated in FIG. 3, the wireless node 106 includes an antenna 302, a transceiver 304, a control and memory circuit 306, sensors 308, and a battery 310. In other examples, the node 300 can include other circuit elements in addition to, or in place of, the components illustrated in FIG. 3. In an example, the antenna 302 and the transceiver 304 can be configured to transmit and receive communication using RF energy. The sensors 308 can be configured, for example, to sense data regarding a vehicle battery such as a voltage or current through a cell of the battery. The battery 310 can be a local battery, or any other local energy storage device such as a capacitor or energy harvester.

Figure 4:
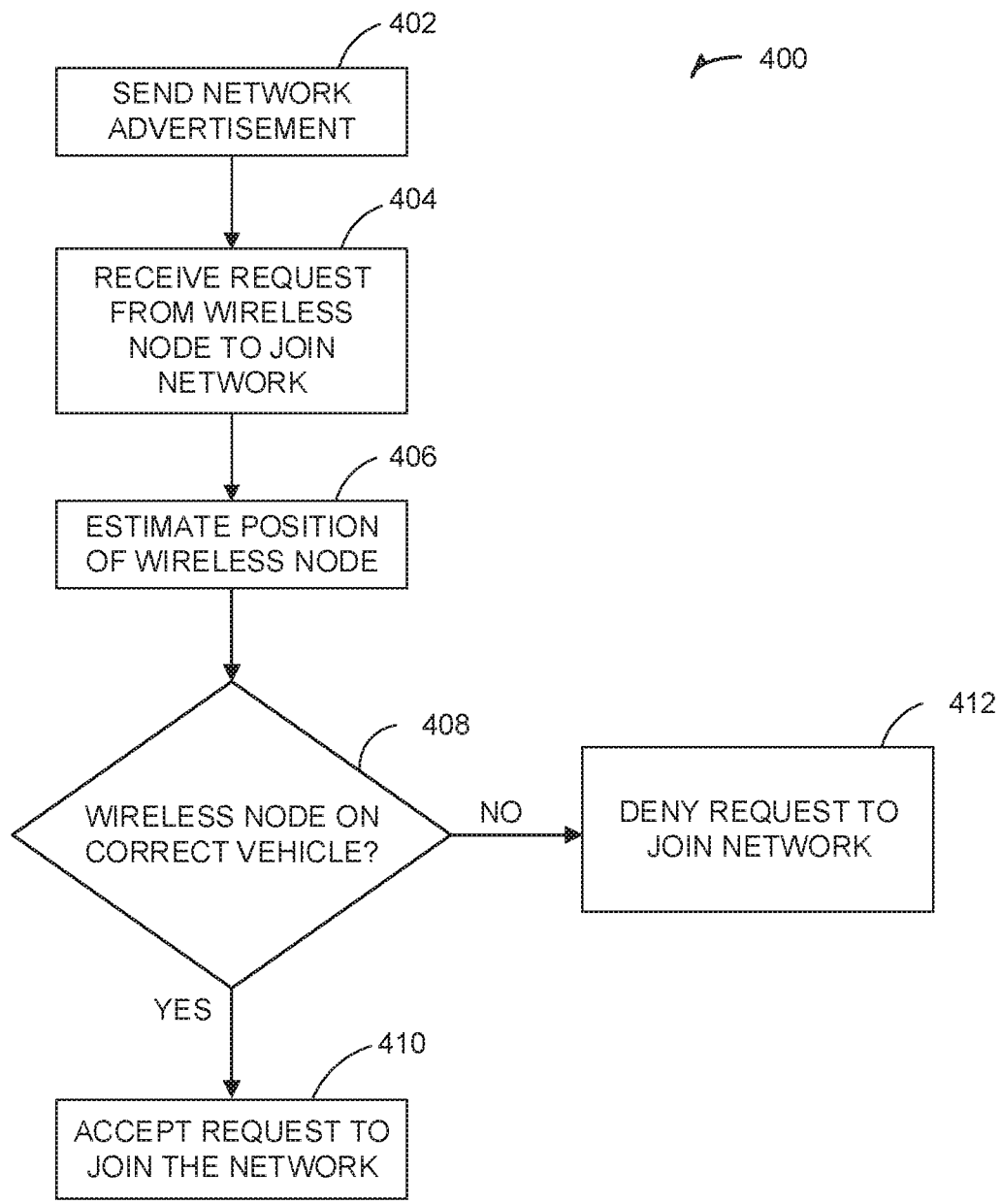
FIG. 4. is a flowchart illustrating a method of identifying a location of a wireless node when establishing a wireless network.

FIG. 4 is a flowchart illustrating a method 400 of automatically joining the wireless nodes 106a-106h to the network associated with the vehicle 102a or other specified area, such as a storage location. At step 402, a network manager 104a or 104b broadcasts an advertisement for the network associated with the vehicle 102a. The wireless nodes 106a-106h and 114a-114h receive the advertisement packet. At step 404, at least one of the wireless nodes 106a-106h and 114a-114h transmit a request to join the network associated with the vehicle 102a. The network managers 104a and 104b receive the request from the respective wireless node. At step 406, the network managers 104a and 104b estimate a location of the requesting wireless node using various techniques disclosed herein. At step 408, the network managers 104a and 104b use the estimated location of the requesting wireless node to determine if the wireless node is on the vehicle 102a. At step 410, if the respective wireless node is located on the vehicle, the network managers 104a and 104b permit the wireless node to join the network associated with the vehicle 102a. At step 412, if the wireless node is not located on the vehicle 102a, the network mangers 104a and 104b deny the request of the wireless node to join the network.

While illustrated with respect to assembly of the vehicle, other scenarios exist in which it is desirable for the network managers 104a and 104b to determine a location of respective wireless nodes 106a-106h. In an example, when a vehicle is being serviced, a battery module may be replaced, and the network managers 104a and 104h may need to re-establish the network for the vehicle. In another example, during vehicle use, a battery module may need to be reconfigured, in which case the network managers 104a and 104b may need to re-establish the network. In these examples, to reliably re-establish the network for the vehicle with possible interference from off-vehicle battery modules, it is desirable for the managers 104a and 104b to use location information to identify the wireless nodes located on the vehicle.

In another example, the network managers 104a and 104b, and 112a and 112b, and the wireless nodes 106a-106h and 114a-114h may be located in a storage facility, server farm, solar farm, or other non-mobile application, rather than on vehicles. In this example, the network managers 104a and 104b, and 112a and 112b may still be configured to determine the locations of the wireless nodes 106a-106h and 114a-114h to join the wireless nodes to respective networks. Knowing the locations of the network nodes within the storage facility, for example, is also beneficial in facilitating immediate location of nodes that have failed, are malfunctioning, or otherwise require service due to anomalous behavior.

Figure 5:
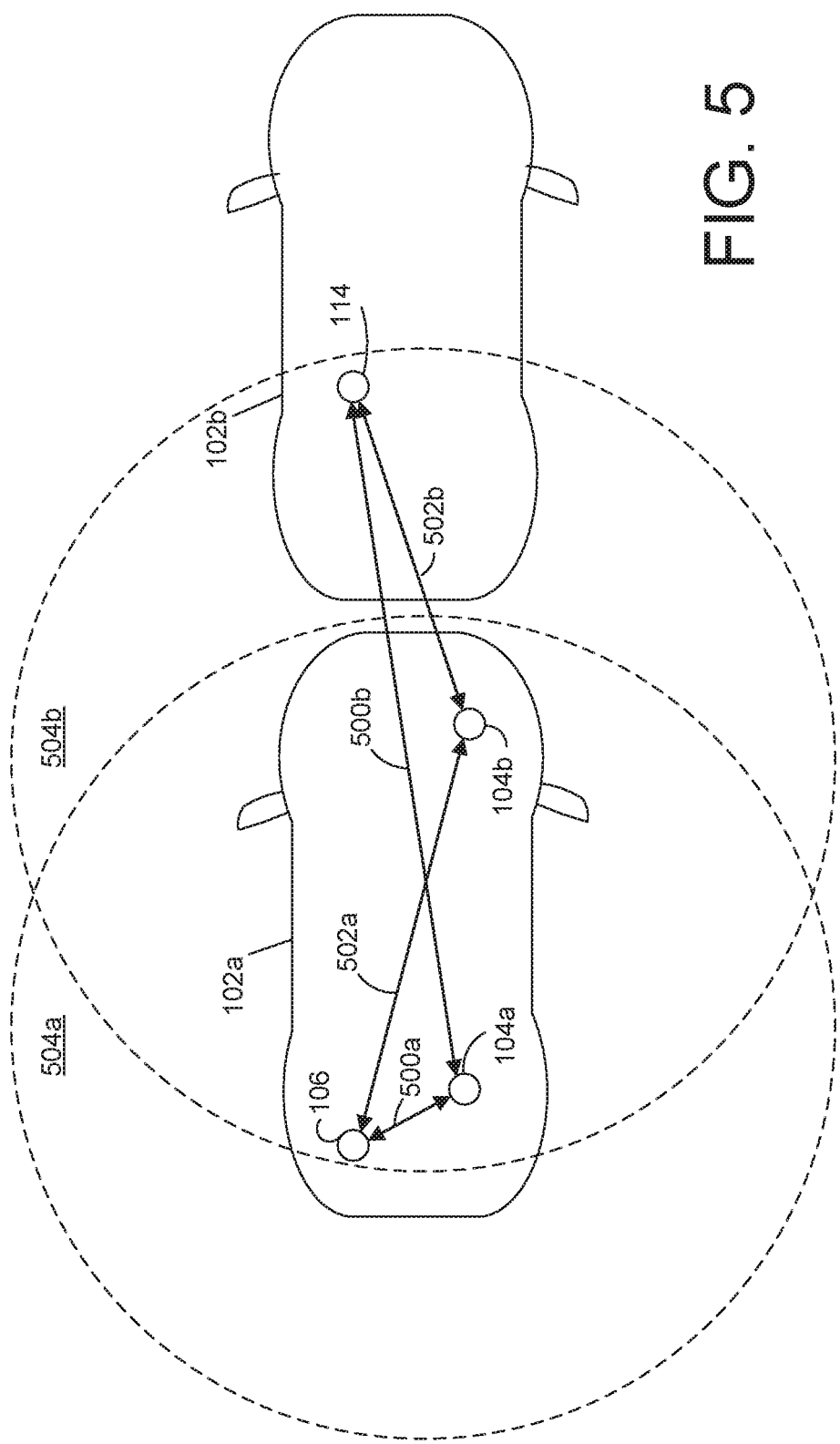
FIG. 5 is a diagram illustrating example network managers configured to estimate distances to wireless nodes.

FIG. 5 is a diagram illustrating example network managers 104a and 104b configured to estimate distances to wireless nodes. In the example illustrated in FIG. 5, the network managers 104a and 104b receive requests to join the network associated with the vehicle 102a from both the wireless node 106 and the wireless node 114. Using wireless proximity detection, the network manager 104a is configured to estimate a distance 500a from the position of the network manager 104a to the wireless node 106, and estimate a distance 500b from the position of the network manager 104a to the wireless node 114. Also using wireless proximity detection, the network manager 104b is configured to estimate a distance 502a from the position of the network manager 104b to the wireless node 106, and estimate a distance 502b from the position of the network manager 104b to the wireless node 114.

The network managers 104a and 104b can be configured to perform wireless proximity detection using respective antennas 202a and 202b and transceivers 204a and 204b. For example, the network managers 104a and 104b can be configured to use RF ranging to estimate the distances 500a, 500b, 502a, and 502b. In other examples, the network managers 104a and 104b can be configured to use any other wireless ranging technique. In one example, the network managers 104a and 104b employ a low power phase-based RF ranging technique such as that disclosed by U.S. patent application Ser. No. 15/955,049, which is incorporated by reference in its entirety. In this example, the wireless node 106 can receive the advertisement packet, adjust a reference clock signal, and send the network join request using the adjusted reference clock signal. The network manager 104 can compare a phase of the original advertisement packet to a phase of the received join request to estimate a distance to the wireless node 106.

Ranges 504a and 504b can be defined for each respective network manager 104a and 104b based on the location of the network manager 104a and 104b. The ranges 504a and 504b can be defined as a radial distance within which all wireless nodes for a respective vehicle will be located. The estimated distances from a network manager 104a or 104b to a wireless node 106 or 1144 can be compared to the ranges 504a and 504b to determine if a wireless node is located on a respective vehicle. For example, for the wireless node 106, the distance 500a is compared to the range 504a and the distance 502a is compared to the range 504b. Because both distances 500a and 502a fall within the respective acceptable ranges 504a and 504b, the wireless node 106 is determined to be located on the vehicle 102a and is permitted to join the network associated with the vehicle 102a. For the wireless node 114, the distance 500b is compared to the range 504a and the distance 502b is compared to the range 504b. Because the distance 500b falls outside of the range 504a, the wireless node 114 is determined to not be located on the vehicle 102a and is denied access to the network associated with the vehicle 102a.

Figure 6:
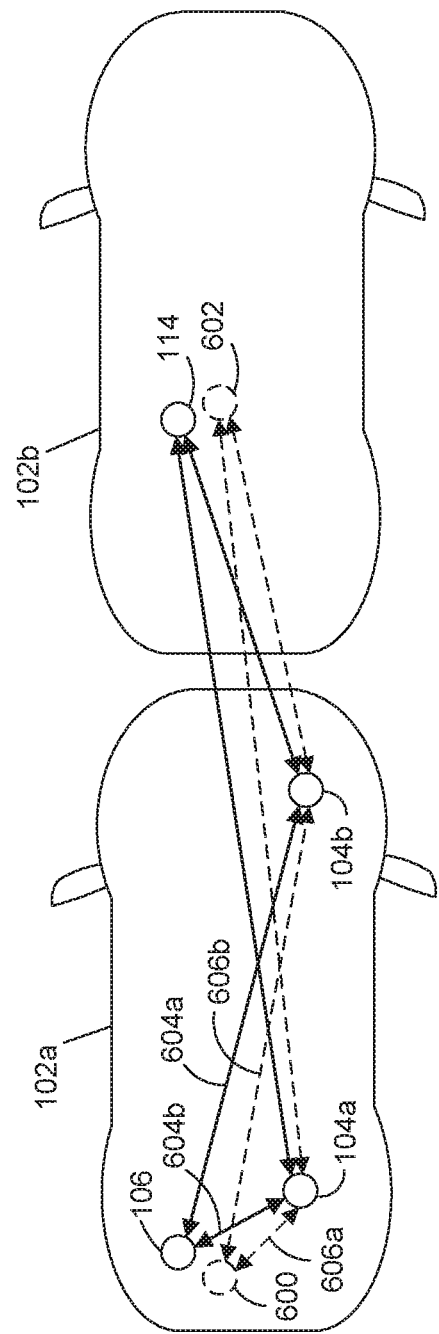
FIG. 6 is a diagram illustrating example network managers configured to estimate physical positions of wireless nodes.

FIG. 6 is a diagram illustrating example network managers 104a and 104b configured to determine estimated positions 600 and 602 of respective wireless nodes 106 and 114. In the example illustrated in FIG. 6, the network managers 104a and 104b can be configured to estimate a distance to each wireless node 106 and 114 using wireless proximity detection techniques, such as those discussed above with reference to FIG. 5. The wireless node 106 has an actual physical distance 604a to network manager 104a, and an actual physical distance 604b to the network manager 104b.

In the example illustrated in FIG. 6, the network manager 104a determines an estimated distance 606a to the wireless node 106, and the network manager 104b determines an estimated distance 606b to the wireless node 106. Using the two estimated distances 606a and 606b, and specified physical locations of the network managers 104a and 104b, the estimated location 600 of the wireless node 106 can be determined. The same process can be used to determine the estimated position 602 for the wireless node 114.

Wireless proximity detection techniques can include some acceptable error in estimated distance. For example, using a low power phase-based RF ranging technique, error can be on the order of 0.5 meters. This results in a difference between the actual physical location of the wireless node 106 and the estimated location 602. However, this difference is small enough with respect to the size of the vehicles 102a and 102b that the estimated locations 600 and 602 are acceptable for use by the network managers 104a and 104b to accurately determine that the wireless node 106 is located on the vehicle 102a and the wireless node 114 is not located on the vehicle 102a. The network managers 104a and 104b can therefore permit the wireless node 106 to join the network associated with the vehicle 102a and deny access to the wireless node 114 based on the estimated locations 600 and 602.

Figure 7:
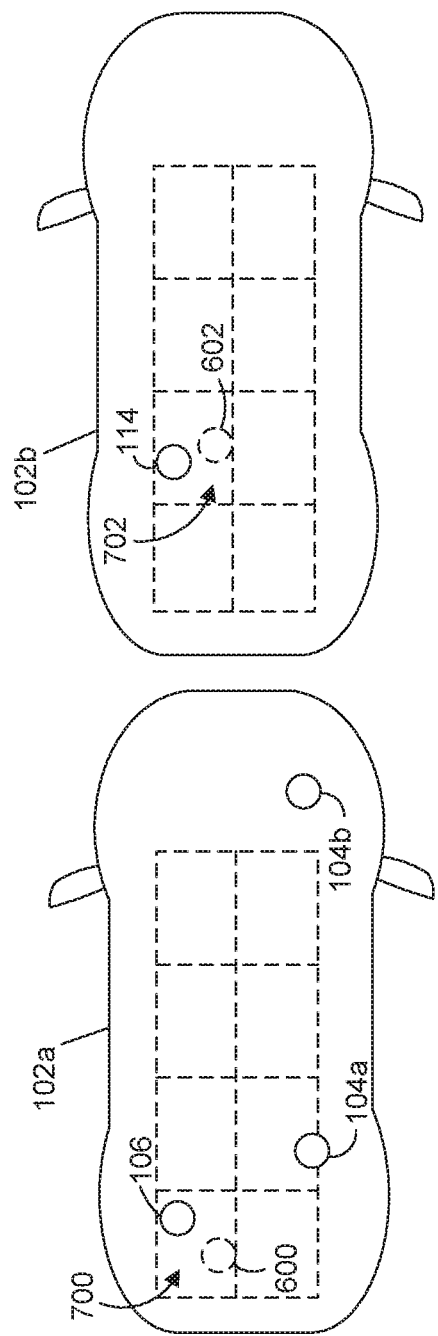
FIG. 7 is a diagram illustrating vehicles that include regions defined within which wireless nodes are expected to reside.

FIG. 7 is a diagram illustrating physical regions 700 and 702 defined for respective vehicles 102a and 102b. As discussed above, it is advantageous to allow autonomous joining of wireless nodes to networks associated with a respective vehicle. In a battery monitoring system, for example, it can also be advantageous to automatically determine an associated battery cell for each wireless node joining the network.

In an illustrative example, physical regions 700 and 702 can be defined for each vehicle 102a and 102b within which wireless nodes are expected to reside. The regions 700 and 702 can be indicative of locations of battery cells, for example. The network managers 104a and 104b can be configured to determine estimated positions 600 and 602 for respective nodes as described above with respect to FIG. 6, for example. The estimated position 600 of the wireless node 106 falls within one of the regions 700 so network managers 104a and 104b permit the wireless node 106 to join the network associated with the vehicle 102a and are able to link the wireless node 106 with a battery cell associated with the respective region 700. The estimated position 602 of the wireless node 114 does not fall within any region 700 and thus, the network managers 104a and 104b can deny access to the wireless node 114 for the network associated with the first vehicle 102a.

Figure 8:
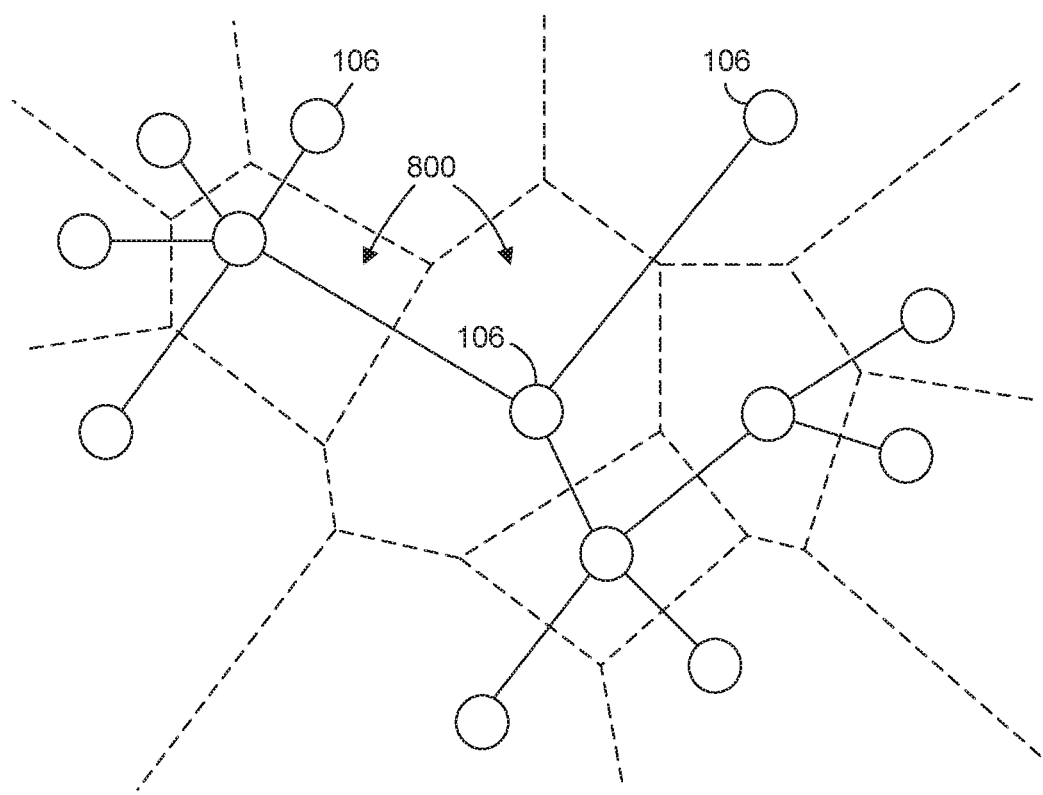
FIG. 8 is a diagram illustrating example Voronoi regions generated using wireless nodes as seeds.

FIG. 8 is a diagram illustrating example regions 800 defined using Voronoi generation. For certain batteries and other vehicle components, regions having simple shapes, such as those illustrated in FIG. 7, can suffice for linking wireless nodes to a respective location or component of a vehicle. However, it can be desirable to define more complex regions for vehicle equipment that does not have a basic shape or form. In an illustrative example, the complex regions 800 can be formed using Voronoi generation. Voronoi regions are defined by distances to a set of seeds in a two-dimensional plane. For each seed, there is a respective region consisting of all points closer to that seed than to any other seed. To define the Voronoi regions 800, the wireless nodes 106 can be used as seeds. A computer system can therefore be used to generate the Voronoi regions 800 based on the expected location of each node 106 for any vehicle. The defined regions 800 generated by the computer system can be provided to the network managers 104a and 104b, for example, for use network establishment.

While illustrated as two-dimensional regions, three-dimensional regions may also be generated in a similar manner. In one example, each node of a battery pack, for example, can be assigned to a respective region 800. This way, a network manager, for example, is able to verify that the battery pack contains an expected number of nodes and correct approximate locations for each node. This can be done to prevent spoofing of nodes or otherwise provide increased security for the battery pack.

Figure 9:
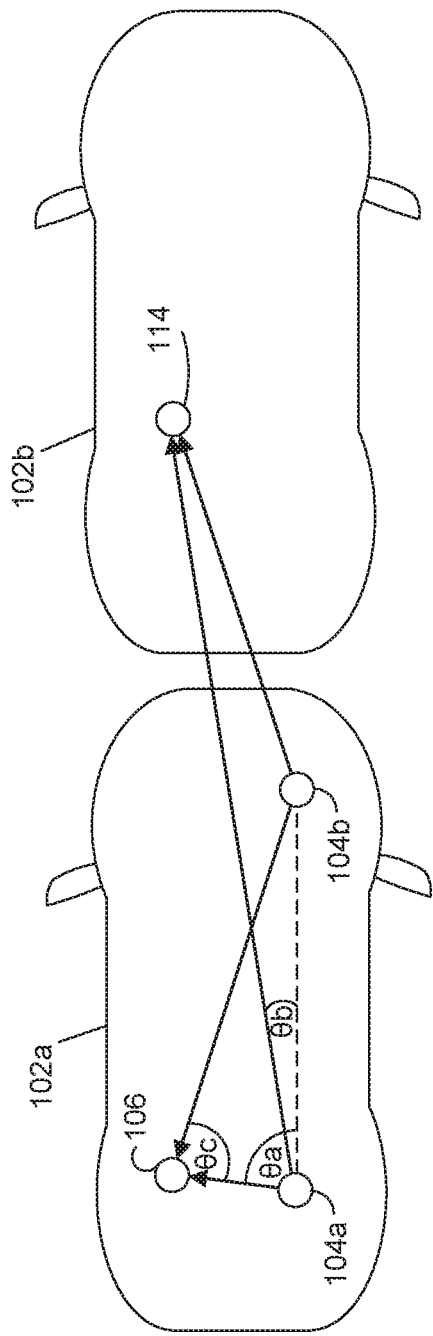
FIG. 9 is a diagram illustrating example network managers configured to estimate locations of wireless nodes using triangulation.

FIG. 9 is a diagram illustrating example network managers 104a and 104b configured to estimate positions of the wireless nodes 106 and 114 using triangulation. In the example illustrated in FIG. 9, the network managers 104a and 104b are axially aligned with respect to each other (as illustrated by the dashed line). Distances to the wireless nodes 106 and 114 can be estimated (illustrate by the arrows) using any of the techniques discussed in the above examples.

Once the distances are estimated, the network managers 104a and 104b can determine various angles, such as the angles $\theta a$, $\theta b$, and $\theta c$, with respect to the network managers 104a and 104b and the wireless nodes 106 and 114. Any one or more of the angles $\theta a$, $\theta b$, and $\theta c$ can be compared to threshold angles defined for a given vehicle 102a to determine if a wireless node is on a respective vehicle. For example, if the angle $\theta c$ is greater than a threshold value, such as 90°, the network managers 104a and 104b can determine that the wireless node 106 is located on the vehicle 102a. In another example, as illustrated in FIG. 9, the angle $\theta a$ is indicative of a wireless node located on vehicle 102a, while the angle $\theta b$ is indicative of a wireless node not located on the vehicle 102a. Therefore, a range of angles for the network manager 104a can be referenced to determine, for an estimated angle, if the requesting wireless node is located on the respective vehicle.

Figure 10:
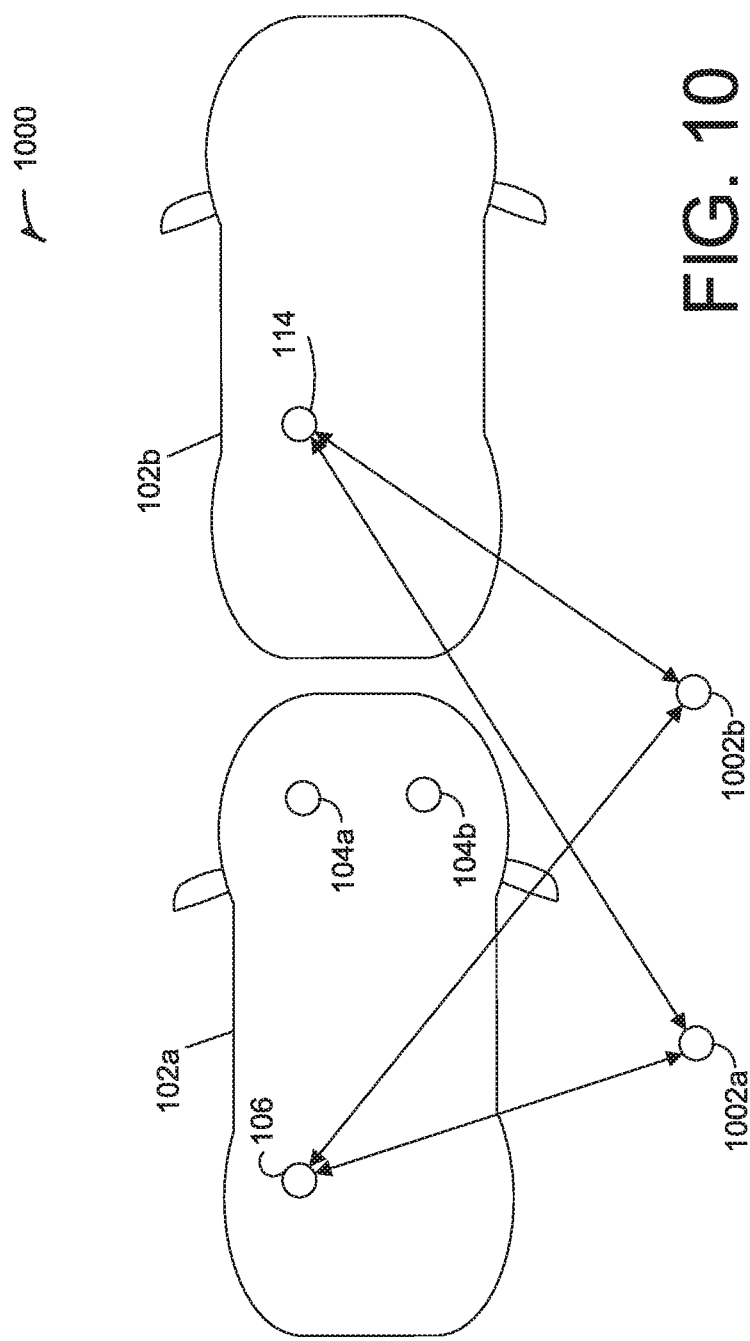
FIG. 10 is a diagram illustrating an example system that includes computing systems located off of vehicles and configured to determine a location of wireless nodes located on the vehicles.

FIG. 10 is a diagram illustrating an example system 1000 that includes computing systems 1002a and 1002b located off of the vehicles 102a and 102b and configured to determine a location of wireless nodes 106 and 114 located on the vehicles 102a and 102b. The computing systems 1002a and 1002b can be network managers or any other computing system that is located off of the vehicles 102a and 102b. For example, the computing systems 1002a and 1002b can be located adjacent to a vehicle assembly line. As the vehicles 102a and 102b pass the computing systems 1002a and 1002b, the computing systems 1002a and 1002b can monitor requests from the wireless nodes 106 and 114 to join the network associated with the vehicle 102a. In another example, the computing systems 1002a and 1002b may be located in a storage facility and configured to monitor request from wireless nodes stored within the storage facility.

Upon detecting a request for a wireless node 106 and 114 to join a network associated with the vehicle 102a, the computing systems 1002a and 1002b can use any of the techniques described above with respect to FIGS. 5-9 to estimate a location of the wireless nodes 106 and 114. The estimated locations can be used to determine if the wireless nodes 106 and 114 are located on the vehicle 102a. For example, upon determination that the wireless node 106 is located on the vehicle 102a, the computing systems 1002a and 1002b can perform a wireless key exchange to provide an encryption key of an encryption keypair to the wireless node 106. The encryption key can then be used by the wireless node 106 to communicate with the network managers 104a and 104b to join the network associated with the vehicle 102a. The network managers 104a and 104b are configured to determine that the wireless node 106 is located on the vehicle 102a using the encryption keypair and permit the wireless node 106 to join the network.

The computing systems 1002a and 1002b can also determine that the estimated location of wireless node 114 indicates that the wireless node 114 is not located on the vehicle 102a and thus, not perform a wireless key exchange. Because the wireless node 114 does not receive an encryption key from the computing devices 1002a and 1002b, the wireless node 114 cannot join the network associated with the vehicle 102a.

In an example, the computing systems 1002a and 1002b can also provide the network managers 104 with a list of wireless nodes located on a respective vehicle. For example, identifiers for each wireless node of a battery pack located on a vehicle may be provided to a network manager of that vehicle. Once the identifiers have been received by the respective network manager, the network manager can permit or deny wireless nodes that request to join a network of the respective vehicle based on the identifiers received by the computing systems 1002a and/or 1002b.

While described in the above examples as the network managers using RF ranging techniques to determine locations of wireless nodes to build a network, RF ranging may be combined with other techniques to build the network. For example, a received signal strength indicator (RSSI) may be used in combination with the RF ranging techniques to determine distances to wireless nodes. In one example, in dense networks, the network managers may perform RF ranging with a few wireless nodes, and these wireless nodes may use RSSI to verify locations of neighboring wireless nodes to build the network based on distances to those neighboring nodes.

Additionally, network managers can use the location of nodes to control the flow of data within an established network. For example, the network manager can verify a location of a node prior to providing data to, or accepting data from, a wireless node within the network. This is beneficial in preventing spoofing of wireless nodes. For example, a spoofed node may exist off of a respective vehicle that attempts to send data to, or receive data from, a network manager of the vehicle. By determining a location of the node, the network manager can determine that the node is not a legitimate node of the network and deny access to data for the node. This can be used in conjunction with certificates or other security measures to increase the security of the network.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a claim are still deemed to fall within the scope of that aspect. Moreover, in the following aspects, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments can be combined with each other in various combinations or permutations. The scope of the invention should be determined with reference to the appended aspects, along with the full scope of equivalents to which such aspects are entitled.

The invention claimed is:

1. A system for automatically associating a plurality of wireless nodes distributed about a vehicle with a wireless network based on location, while excluding nearby wireless nodes based on location, the system comprising:
   a first wireless network manager device located at a first specified location on the vehicle and configured to receive a wireless request to join the wireless network from a requesting wireless node; and a second network manager device located at a second specified location on the vehicle;

wherein the first network manager device is configured to estimate a first distance to the requesting wireless node from the first specified location using wireless proximity detection, and the second network manager device is configured to estimate a second distance to the requesting wireless node from the second specified location using wireless proximity detection, and wherein the first wireless network manager device is configured to determine, using the estimated first and second distances, whether the requesting wireless node is located on the vehicle and, if so, to permit the requesting wireless node to join the wireless network.

2. The system of claim 1, wherein at least one of the first network manager device and the second network manager device are configured to determine if the requesting wireless node is located on the vehicle based on a comparison of the first distance to a first threshold range and a comparison of the second distance to a second threshold range.

3. The system of claim 1, wherein at least one of the first and the second network manager devices is configured to estimate a physical location of the requesting wireless node using the first distance and the second distance, and determine if the requesting wireless node is located on the vehicle using the estimated physical location.

4. The system of claim 3, wherein the vehicle is divided into a plurality of regions, and wherein at least one of the first and the second network manager devices is configured to determine within which of the plurality of regions the requesting wireless node is located using the estimated physical location.

5. The system of claim 4, wherein the plurality of regions are Voronoi regions generated using expected locations for each of the plurality of wireless nodes as seeds.

6. The system of claim 1, wherein the first and the second network manager devices use triangulation to determine an angle between one of the first and the second network manager devices and the requesting wireless node, and wherein at least one of the first and the second network manager devices is configured to determine if the requesting wireless node is located on the vehicle by comparing the angle to a threshold range of angles.

7. The system of claim 1, wherein the vehicle is a first vehicle, and wherein the system further comprises a second vehicle, and wherein the first vehicle and the second vehicle are automobiles located on an assembly line, and wherein the plurality of nodes are sensors for a vehicle battery monitoring system.

8. The system of claim 1, wherein the first network manager device is configured to use phase-based radio-frequency ranging to perform the wireless proximity detection.

9. The system of claim 1, wherein the first network manager device is configured to verify, using the wireless proximity detection, a location of a respective wireless node prior to transmitting data to the respective wireless node.

10. The system of claim 1, wherein the first network manager comprises a first antenna and a second antenna, and wherein the first network manager is configured to employ at least one of antenna diversity techniques, antenna polarization techniques or directional antenna techniques to perform the wireless proximity detection.

11. A method of automatically associating wireless nodes distributed about a first vehicle with a wireless network associated with the specified area, while excluding nearby wireless nodes that are not located within the first vehicle, the method comprising:

receiving, by a first network manager device positioned at a first specified location on the vehicle, a wireless request to join the wireless network from a requesting wireless node;

estimating, by the first network manager device, a first distance from the first specified location to the requesting wireless node using wireless proximity detection;

estimating, by a second network manager device positioned at a second specified location on the vehicle, a second distance from the second specified location to the requesting wireless node using wireless proximity detection;

determining, by at least one of the first and the second network manager devices using the estimated first and second distances, if the requesting wireless node is located on the first vehicle; and permitting the requesting wireless node to join the wireless network if the requesting wireless node is located on the first vehicle.

12. The method of claim 11, wherein determining, by at least one of the first and the second network manager devices, if the requesting wireless node is located on the vehicle comprises:

comparing the first distance to a first threshold;
comparing the second distance to a second threshold; and
determining that the requesting wireless node is located on the vehicle if the first distance is less than the first threshold and the second distance is less than the second threshold.

13. The method of claim 11, wherein determining, by at least one of the first and the second network manager devices, if the requesting wireless node is located on the vehicle comprises estimating a physical location of the requesting wireless node using the first distance and the second distance.

14. The method of claim 13, further comprising:
defining a plurality of regions of the vehicle; and
identifying, using the estimated physical location of the requesting wireless node, within which of the plurality of regions the requesting wireless node is located.

15. The method of claim 14, wherein defining the plurality of regions of the vehicle comprises generating Voronoi regions using expected locations of a plurality of nodes positioned about the vehicle as seeds.

16. The method of claim 11, wherein determining, by at least one of the first and the second network manager devices, if the requesting wireless node is located on the vehicle comprises:

determining, using triangulation, an angle between one of the first or the second network manager devices and the requesting wireless node; and comparing the angle to a threshold range of angles to determine if the requesting wireless node is located on the vehicle.

17. The method of claim 11, wherein determining, by the first network manager device using wireless proximity detection, if the requesting wireless node is located on the first vehicle comprises employing, by the first network manager, at least one of antenna diversity techniques, antenna polarization techniques or directional antenna techniques.

18. A system for automatically associating a plurality of wireless nodes positioned about a vehicle with a wireless network based on location, while excluding nearby wireless nodes based on location, the system comprising:
- a first network manager device located at a first location on the vehicle and configured to receive a wireless request to join the wireless network from a requesting wireless node; and
- a second network manager device located at a second location on the vehicle;
- wherein the first network manager device is configured to estimate a first distance to the requesting wireless node from the first location using wireless proximity detection, and the second network manager device is configured to estimate a second distance to the requesting wireless node from the second location using wireless proximity detection, and
- wherein at least one of the first wireless network manager device and the second network manager device are configured to determine, using the estimated first and second distances, whether the requesting wireless node is located on the vehicle and, if so, to permit the requesting wireless node to join the wireless network.

19. The system of claim 18, wherein at least one of the first network manager device and the second network manager device are configured to determine if the requesting wireless node is located on the vehicle based on a comparison of the first distance to a first threshold range and a comparison of the second distance to a second threshold range.

20. The system of claim 18, wherein at least one of the first and the second network manager devices is configured to estimate a physical location of the requesting wireless node using the first distance and the second distance, and determine if the requesting wireless node is located on the vehicle using the estimated physical location.

* * * * *